United States Patent
Lin et al.

(10) Patent No.: US 10,247,892 B2
(45) Date of Patent: Apr. 2, 2019

(54) OPTICAL TRANSCEIVER MODULE HAVING A PARTITIONED HOUSING

(71) Applicant: Applied Optoelectronics, Inc., Sugar Land, TX (US)

(72) Inventors: Kai-Sheng Lin, Sugar Land, TX (US); Hsiu-Che Wang, Rosenberg, TX (US); I-Lung Ho, Sugar Land, TX (US)

(73) Assignee: Applied Optoelectronics, Inc., Sugar Land, TX (US)

(*) Notice: Subject to any disclaimer, the term of this patent is extended or adjusted under 35 U.S.C. 154(b) by 0 days.

(21) Appl. No.: 15/242,017

(22) Filed: Aug. 19, 2016

(65) Prior Publication Data
US 2018/0052291 A1 Feb. 22, 2018

(51) Int. Cl.
*G02B 6/255* (2006.01)
*G02B 6/42* (2006.01)

(52) U.S. Cl.
CPC ......... *G02B 6/4256* (2013.01); *G02B 6/4246* (2013.01); *G02B 6/4277* (2013.01); *G02B 6/4281* (2013.01); *G02B 6/4292* (2013.01)

(58) Field of Classification Search
CPC .. G02B 6/4256; G02B 6/4246; G02B 6/4277; G02B 6/4281; G02B 6/4292
USPC .......... 385/14–15, 92, 88; 398/135, 138–139
See application file for complete search history.

(56) References Cited

U.S. PATENT DOCUMENTS

| | | | | |
|---|---|---|---|---|
| 7,425,098 B2* | 9/2008 | Meadowcroft | ...... | G02B 6/4201 361/816 |
| 2010/0008630 A1* | 1/2010 | Marrapode | .......... | G02B 6/3897 385/78 |
| 2013/0022309 A1* | 1/2013 | Yu | ........................ | G02B 6/4201 385/14 |
| 2013/0071072 A1* | 3/2013 | Xie | ...................... | G02B 6/4277 385/92 |
| 2015/0372760 A1* | 12/2015 | Kagaya | ................ | G02B 6/4215 398/118 |
| 2016/0192545 A1* | 6/2016 | Mao | ..................... | H05K 9/0058 398/136 |
| 2016/0238805 A1* | 8/2016 | McColloch | .......... | G02B 6/4268 |

* cited by examiner

*Primary Examiner* — Ryan Lepisto
*Assistant Examiner* — Guy Anderson
(74) *Attorney, Agent, or Firm* — Grossman Tucker Perreault & Pfleger, PLLC (57) ABSTRACT

A transceiver module having a partitioned housing, e.g., a bifurcated or multi-segment housing, is disclosed that allows coupling and alignment of a TOSA arrangement and ROSA arrangement in separate respective portions in order to minimize or otherwise reduce component damage and rework iterations during manufacturing and repair. Technicians may thus perform at least partial assembly and testing of each optical subassembly arrangement in parallel and in relative isolation without necessarily interrupting and/or waiting on completion of the other. In a general sense, each separate portion of the partitioned housing provides a dedicated workspace of about equal dimension for coupling of subassembly components. Each separate portion may lie flat on a tabletop, for instance, which may further simplify manufacturing processes and provide a wide-range of acceptance angles for performing soldering, welding, insertion and coupling of components, visual inspection, fiber routing, and so on.

20 Claims, 5 Drawing Sheets

OPTICAL TRANSCEIVER MODULE HAVING A PARTITIONED HOUSING

TECHNICAL FIELD

The present disclosure is related to optical transceivers modules and more particularly to an optical transceiver module that includes a partitioned housing that is small-form factor (SFF) compatible and provides separate portions for mounting and alignment of respective optical subassemblies to decrease manufacturing complexity, manufacturing time per unit, and increase overall yield.

BACKGROUND

Optical transceivers are used to transmit and receive optical signals for various applications including, without limitation, internet data centers, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to maintaining optical efficiency (power), thermal management, and manufacturing yield. Optical transceivers can include one or more transmitter optical subassemblies (TOSAs) and receiver optical subassemblies (ROSAs) for the purpose of transmitting and receiving optical signals. As channel density and increased speed becomes an increasingly important aspect of optical transceivers, the ability to scale-down while maintaining nominal transceiver performance raises numerous non-trivial challenges.

BRIEF DESCRIPTION OF THE DRAWINGS

These and other features and advantages will be better understood by reading the following detailed description, taken together with the drawings, wherein.

DETAILED DESCRIPTION

Optical transceiver modules often include transmitter optical subassemblies (TOSAs) and receiver optical subassemblies (ROSAs) within a housing or body. An optical transceiver module may operate as a stand-alone optical transceiver, or may be integrated into a secondary housing that comports with, for instance, a small form-factor (SFF) housing standard such as the one outlined within the "QSFP+28 Gb/s 4× Pluggable Transceiver Solution (QSFP28)" specification published on Jun. 29, 2015 by the SFF Committee. Such small form-factor housings introduce significant dimensional constraints that reduce the overall workspace within a transceiver housing which increases manufacturing complexity, error rates, and overall time to produce each optical transceiver module. For instance, manufacturing tasks such as optically aligning the TOSA and/or ROSA becomes increasingly difficult as housing dimensions scale. Specialized tools to align components of a ROSA arrangement, such as an arrayed waveguide grating (AWG) device, may inadvertently displace or damage adjacent optical components by virtue of the dimensions of the tool itself. During two-phase manufacturing processes that first couple and optically align a TOSA or ROSA, and then couple and optically align the other of the TOSA or ROSA, may require multiple iterations and rework as alignment to the ROSA may result in a misaligned TOSA, and vice-versa. Each time an optical transceiver is reworked in this manner increases the chance of component damage. The aggregate effect may thus reduce overall yield and increase cost to produce each unit, e.g., based on increased manufacturing time and replacement parts.

Thus, in accordance with an embodiment of the present disclosure, a transceiver module having a partitioned housing, e.g., a bifurcated or multi-segment housing, is disclosed that allows coupling and alignment of a TOSA arrangement and ROSA arrangement in separate respective portions in order to minimize or otherwise reduce component damage and rework iterations during manufacturing and repair. Technicians may thus perform at least partial assembly and testing of each optical subassembly arrangement in parallel and in relative isolation without necessarily interrupting and/or waiting on completion of the other. In a general sense, each separate portion of the partitioned housing provides a dedicated workspace for coupling associated subassembly components. Each separate portion may lie flat on a tabletop, for instance, which may further simplify manufacturing processes and provide a wide-range of acceptance angles for performing soldering, insertion and coupling of components, visual inspection, fiber routing, and so on.

Once the TOSA and ROSA arrangements are sufficiently assembled within respective portions of the segmented housing, a technician may simply "flip" one portion of the partitioned housing over onto the other to couple the portions together and to collectively form an assembled optical transceiver module. For example, the ROSA housing portion of the partitioned housing may be "flipped" onto the TOSA housing portion, with the TOSA housing portion forming the base (or bottom) of the assembled optical transceiver module. Thus, the ROSA housing portion may be accurately referred to as having a "flip over" configuration, whereby the ROSA arrangement faces the TOSA arrangement in a upside down manner when their respective housing portions are coupled together. Each of the TOSA and ROSA housing portions of the housing may include corresponding mateable features designed to interlock/mate with each other to form essentially a monolithic or integral optical transceiver module housing. The assembled optical transceiver module may then include a single compartment formed by the respective housing portions or may include a plurality of partitions defined by, for instance, a shield or other internal structure that separates ROSA and TOSA housing portions for purposes of electrical isolation, thermal conductivity, and RF shielding, for example. In some cases, the assembled optical transceiver module may then be inserted into a QSFP+ or other SFF secondary housing, for instance, depending on a desired configuration.

In more detail, an optical transceiver module consistent with an embodiment of the present disclosure is defined by housing separable into at least two portions, namely at least a first portion having a TOSA arrangement (which may be referred to as a TOSA housing portion) and a second portion having a ROSA arrangement (which may be referred to as a ROSA housing portion). Each of the first and second portions include a base that provides one or more substantially planar mounting surfaces for coupling to associated ROSA/TOSA arrangements and associated circuitry. A plurality of sidewalls may extend substantially vertically from each base and provide a compartment/cavity there between to receive associated ROSA/TOSA components. At least one sidewall of each base may include an LC port receptacle designed to couple to a respective LC connector and receive the other's LC connector such that when the TOSA and ROSA housing portions are coupled together each LC connector extends in parallel from the same end of the assembled optical transceiver module. Once coupled, the assembled optical transceiver module may fully enclose the TOSA and ROSA arrangement and prevent the ingress of dust and other contaminants.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals.

Figure 1:
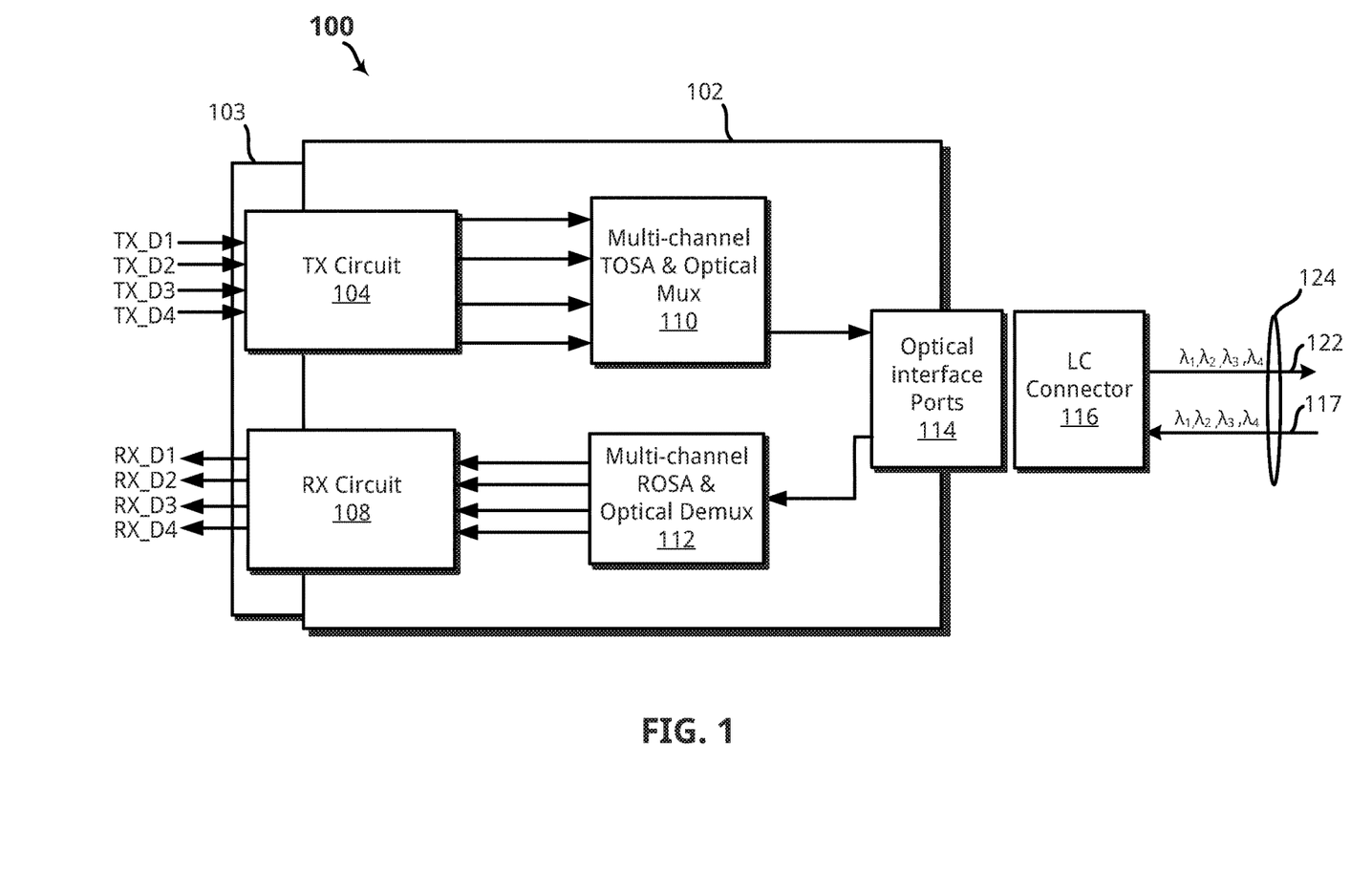
FIG. 1 schematically illustrates an embodiment of an optical transceiver including a multi-channel transmitter optical subassembly (TOSA) and multi-channel receiver optical subassembly (ROSA).

Now turning to FIG. 1, there is an optical transceiver 100 consistent with embodiments of the present disclosure. In more detail, the optical transceiver 100 transmits and receives four (4) channels using four different channel wavelengths ($\lambda_1$, $\lambda_2$, $\lambda_3$, $\lambda_4$) and may be capable of transmission rates of at least about 25 gigabits (Gbs) per channel or more. In one example, the channel wavelengths $\lambda_1$, $\lambda_2$, $\lambda_3$, $\lambda_4$ may be 1270 nm, 1290 nm, 1310 nm, and 1330 nm, respectively. The optical transceiver 100 may also be capable of both short transmission distances of tens of meters, for example, to distances of 2 kilometers or more. The optical transceiver 100 may be used, for example, in internet data center applications or fiber to the home (FTTH) applications. In an embodiment, the optical transceiver 100 implements a Quad Small Form-Factor Pluggable (QSFP) transceiver. For example, the optical transceiver 100 may be implemented within a QSFP transceiver that comports with the QSFP28 specification as discussed above. The aspects and embodiments disclosed herein may be used within other transceiver types and is not necessarily limited to QSFP or QFSP+ transceivers. The optical transceiver 100 may be configured for dense wavelength division multiplexing (DWDM) or course wavelength division multiplexing (CWDM), depending on a desired configuration. Although aspects and scenarios disclosed herein discuss a four (4) channel configuration, other channel configurations, e.g., 2, 4, 16, 32, and so on, are within the scope of this disclosure.

As shown, the optical transceiver 100 includes a transceiver housing 102 that may include a multi-channel TOSA arrangement 110 for transmitting optical signals on different channel wavelengths, and a multi-channel ROSA 112 for receiving optical signals on different channel wavelengths within a single transceiver housing, as will be discussed further herein. A transmit connecting circuit 104 and a receive connecting circuit 108 provide electrical connections to the multi-channel TOSA arrangement 110 and the multi-channel ROSA arrangement 112, respectively, within the transceiver housing 102. The transmit connecting circuit 104 and the receive connecting circuit 108 may communicate with external systems via data bus 103. In some cases, data bus 103 is a 38-pin connector that comports with physical connector QSFP standards and data communication protocols.

In any event, the transmit connecting circuit 104 electrically couples to the electronic components in the multi-channel TOSA arrangement 110, e.g., laser assemblies, and the receive connecting circuit 108 electrically couples to the electronic components in the multi-channel ROSA 112, e.g., an arrayed waveguide grating (AWG), detectors, amplification circuitry and so on. The transmit connecting circuit 104 and the receive connecting circuit 108 include at least conductive paths to provide electrical connections, and may also include additional circuitry. The multi-channel TOSA arrangement 110 transmits and multiplexes multiple different channel wavelengths, and is coupled to an optical interface port 114. The optical interface port 114 may include an LC connector port, although other connector types are also within the scope of this disclosure.

In cases where the optical interface port 114 comprises a duplex, or bi-directional, LC receptacle, the LC connector receptacle provides optical connections to the multi-channel TOSA arrangement 110, and provides optical connections to the multi-channel ROSA 112. The LC connector receptacle may be configured to receive and be coupled to a mating LC connector 116 such that transmit optical fiber 122 of the external fibers 124 optically couples to the multi-channel arrangement TOSA 110, and the receive optical fiber 117 of the external fibers 124 optically couples to the multi-channel ROSA 112.

The multi-channel TOSA arrangement 110 can include multiple laser packages and optics for producing associated channel wavelengths, and can couple the same into the transmit optical fiber 122. In particular, the lasers in the multi-channel TOSA arrangement 110 can convert electrical data signals (TX_D1 to TX_D4) received via the transmit connecting circuit 104 into modulated optical signals transmitted over transmit optical fiber 122. The lasers may include, for example, distributed feedback (DFB) lasers with diffraction gratings. In other cases, the lasers may comprise electro-absorption modulated laser (EML) laser diode packages. The multi-channel TOSA arrangement 110 may also include monitor photodiodes for monitoring the light emitted by the lasers. The multi-channel TOSA arrangement 110 may further include one or more temperature control devices, such as a resistive heater and/or a thermoelectric cooler (TEC), for controlling a temperature of the lasers, for example, to control or stabilize the laser wavelengths.

The multi-channel ROSA 112 can include demultiplexing optics such as an AWG device and a plurality of detectors such as photodiode packages configured to receive de-multiplexed channel wavelengths. The ROSA 112 can use the detectors and associated circuitry (e.g., a TIA) to detect, amplify, and convert de-multiplexed channel wavelengths and can provide the same as electrical data signals, e.g., RX_D1 to RX_D4.

Example Optical Transceiver Module Having a Partitioned Housing

Figure 2A:
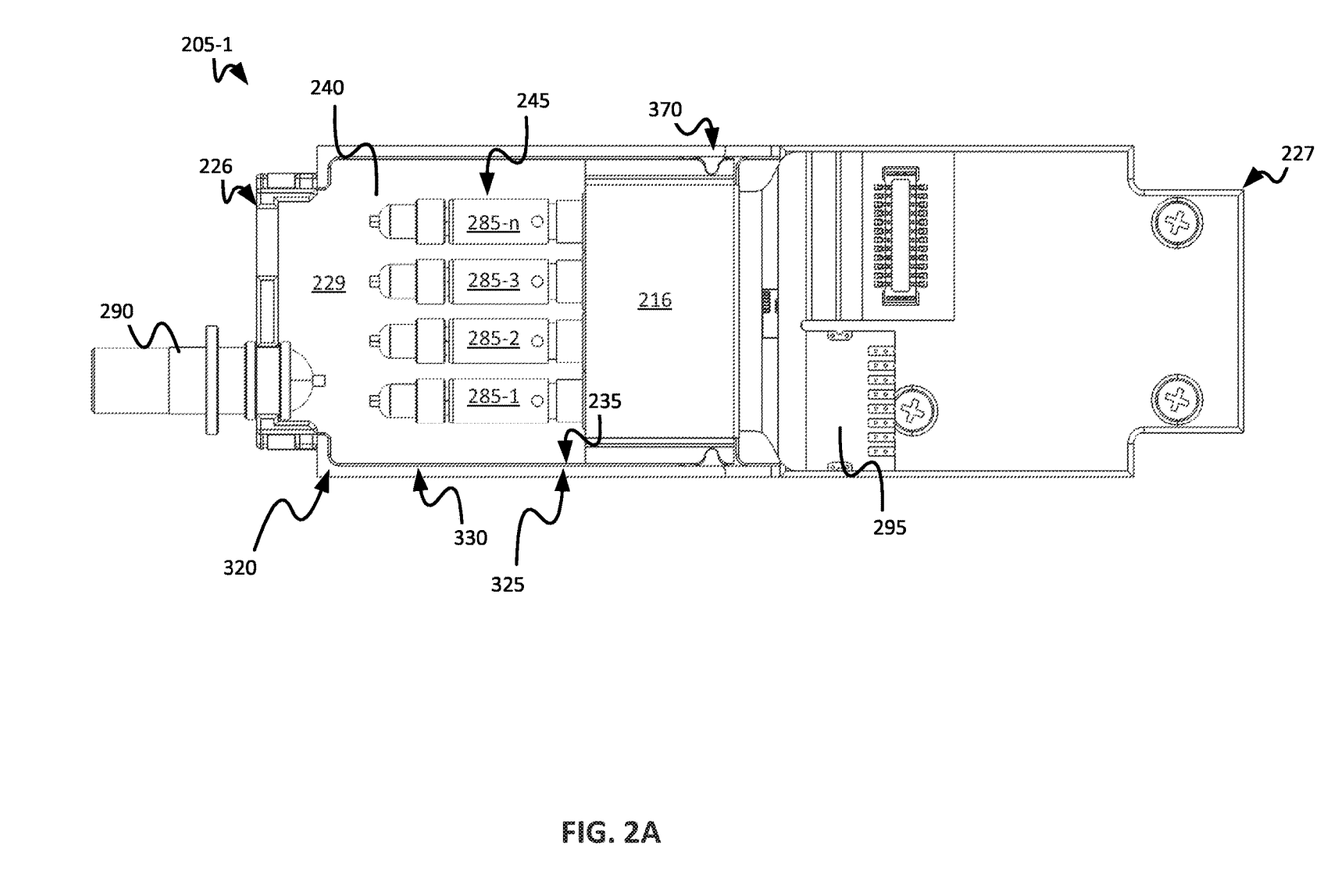
FIG. 2A is a top plan view of a first portion of an optical transceiver module housing configured to couple to a transmitter optical subassembly (TOSA) arrangement, in accordance with an embodiment of the present disclosure.
Figure 2B:
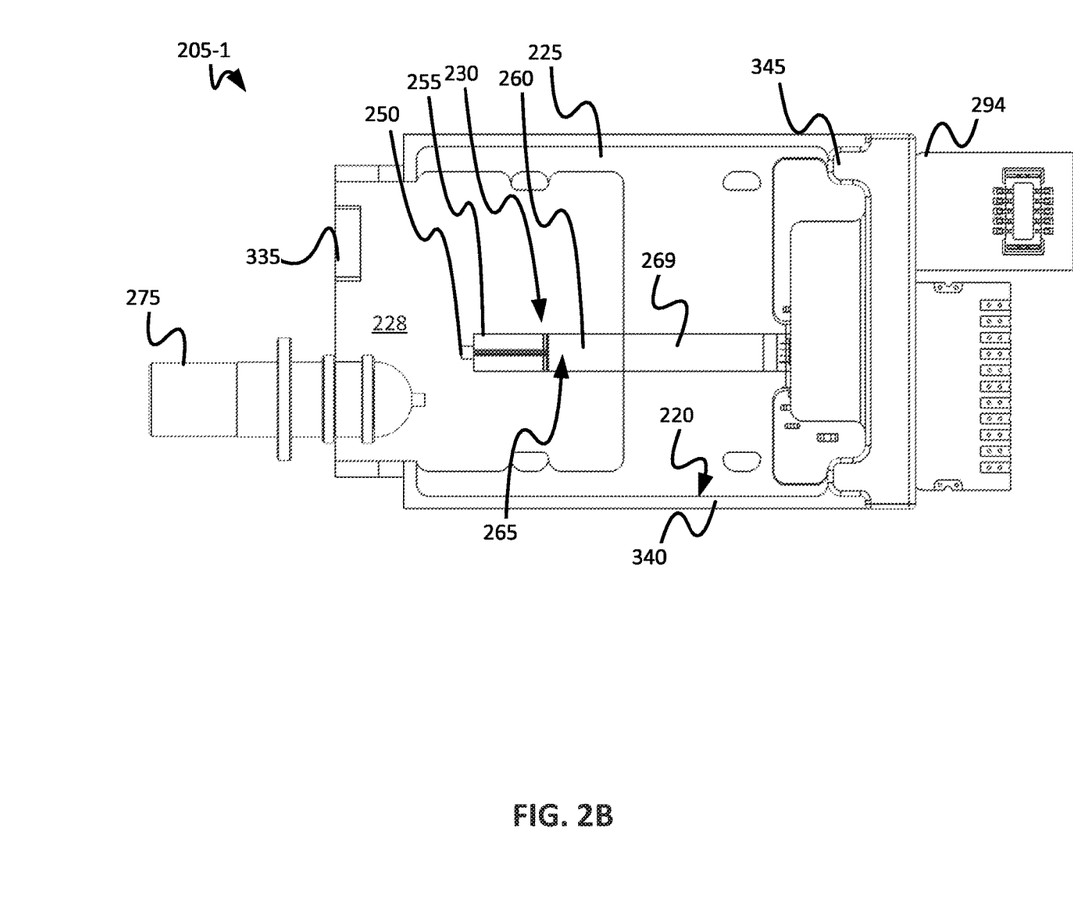
FIG. 2B is a top plan view of a second portion of an optical transceiver module housing configured to couple to a receiver optical subassembly (ROSA) arrangement, in accordance with an embodiment of the present disclosure.

Now turning to FIGS. 2A and 2B, first and second portions 205-1 and 205-2 of an optical transceiver module housing 205 (FIG. 3B) are shown in accordance with an embodiment of the present disclosure. An example assembled optical transceiver module 400 having both the first and second portions 205-1 and 205-2 coupled together is shown and described in greater detail below with reference to FIG. 3B. Each of the first and second portions 205-1 and 205-2 will now be discussed in turn.

FIG. 2A shows a top plan view of a first portion 205-1 of an optical transceiver module housing 205 configured to couple to a transmitter optical subassembly (TOSA) arrangement, in accordance with an embodiment of the present disclosure. The first portion 205-1 may also be accurately referred to as a TOSA housing portion 205-1. As shown, the TOSA housing portion 205-1 may include at least one sidewall 330 extending outwardly from a base 229 such that the base 229 and an interior surface 235 of the at least one sidewall 330 define a first compartment (or cavity) 240. The first compartment 240 includes a TOSA arrangement 245 coupled to an interior surface the base 229 and/or the interior surface 235. The TOSA arrangement 245 may extend longitudinally within the first compartment 240. Additional aspects of the TOSA arrangement 245 are shown in greater detail in FIG. 4, which illustrates the TOSA housing portion 205-1 without the shield member 216 attached.

As further shown in FIG. 2A, the TOSA housing portion 205-1 of the housing 205 includes the TOSA 245 arrangement coupled thereto. The TOSA arrangement 245 may be coupled to the TOSA housing portion 205-1 via, for example, screws, adhesive, friction fit, tape, welds, or by any other suitable approach. The TOSA arrangement 245 may include one or more laser packages 285-1 to 285-N configured to emit associated channel wavelengths. Each of the laser packages 285-1 to 285-N may be configured to generate an associated channel wavelength. The laser packages 285-1 to 285-N may include any suitable laser device, such as DFB laser as previously discussed. Each of the laser packages 285-1 to 285-N may optically couple to the optical interface port 290 by way of an intermediate fiber or suitable waveguide device (not shown). Each of the laser packages 285-1 to 285-N may also electrically couple to a flexible printed circuit (FPC) 295 for power and signaling/driving purposes. The FPC 295 carries an electrical driving signal and/or power for each of the laser packages 285-1 to 285-N. In some cases, the FPC 295 may also be coupled to the TOSA housing portion 205-1 in a manner similar to components of the TOSA arrangement 245 discussed above, which will not be repeated for brevity. However, the FPC 295 may also be simply coupled to the TOSA arrangement 245, e.g., via wire bonding, without necessarily being also coupled to surfaces of the TOSA housing portion 205-1. In any event, the first compartment 240 may be configured to receive the TOSA arrangement 245 and associated circuitry, and therefore, may generally be described as being a TOSA compartment 240.

Turning to FIG. 2B, a top plan view of the second portion 205-2 of an optical transceiver module housing 205 is shown and may be configured to receive and couple to a receiver optical subassembly (ROSA) arrangement, in accordance with an embodiment of the present disclosure. As shown, the ROSA housing portion 205-2 may include at least one sidewall 340 extending outwardly from a base 228 such that the base 228 and an interior surface 220 of the at least one sidewall 340 define a second compartment (or cavity) 225. The at least one sidewall 340 may extend from the first end 226 to the second end 227 of the ROSA housing portion 205-2. The ROSA arrangement 230 may be coupled to the base 228 and/or the interior surface 220 of the second compartment 225 of the housing 205. As such, the first compartment 225 may be configured to receive the ROSA arrangement 230 and may be generally described as a ROSA compartment 230. In an embodiment, the first and second compartments 240 and 225 advantageously provide a substantially equal amount of total surface area, or total mounting surface area, for attachment of associated optical component assemblies, optical fiber(s), associated circuitry including FPCs 294 and 295, and so on. Further, the first and second compartments 240 and 225 may advantageously include a substantially equal volume. Stated differently, the first and second compartments 240 and 225 may provide a substantially similar amount of internal workspace for coupling and alignment of associated components.

Figure 4:
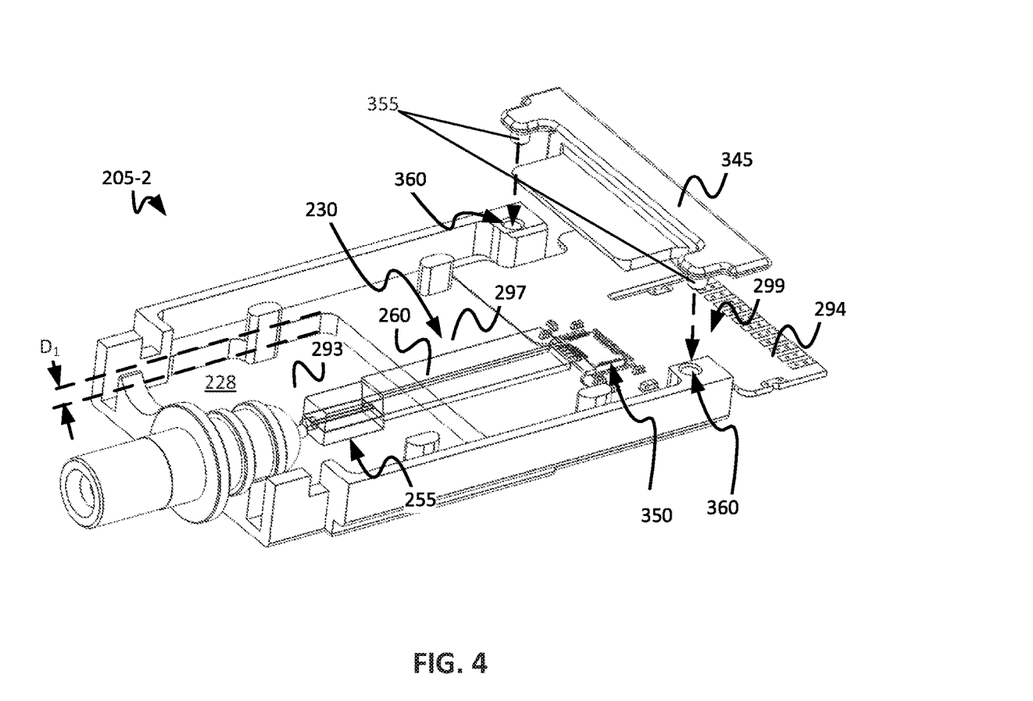
FIG. 4 shows a perspective view of a second portion of the optical transceiver module housing of FIG. 2B, in accordance with an embodiment of the present disclosure.

Continuing with FIG. 2B, the ROSA arrangement 230 includes an arrayed waveguide grating (AWG) device 260, with the AWG device 260 including an optical coupling port 250, an input coupling region 255, an AWG chip region 269, and an array of photodiodes and associated transimpedance amplifiers (TIAs) 350, which are shown more clearly in FIG. 4. An optical interface port 275, e.g., an LC connector port, may be coupled to the ROSA housing portion 205-2 at the first end 226 of the transceiver housing 205. The optical interface port 275 may be optically coupled to the optical coupling port 250 of the AWG device 260 by way of an intermediate fiber (not shown) or other suitable device such as a waveguide. The optical coupling port 250 of the AWG device 260 is optically coupled to the input coupling region 255. The input coupling region 255 may be optically coupled to a first end of the AWG device 260 in order to launch an optical signal into waveguide gratings of the AWG device 260. The AWG device 260 may be implemented in accordance with the AWG device disclosed in the co-pending U.S. application Ser. No. 15/137,823 titled "Techniques for Direct Optical Coupling of Photodetectors to Optical Demultiplexer Outputs and an Optical Transceiver Using the Same" filed on Apr. 25, 2016, the entirety of which is incorporated herein by reference.

Figure 3A:
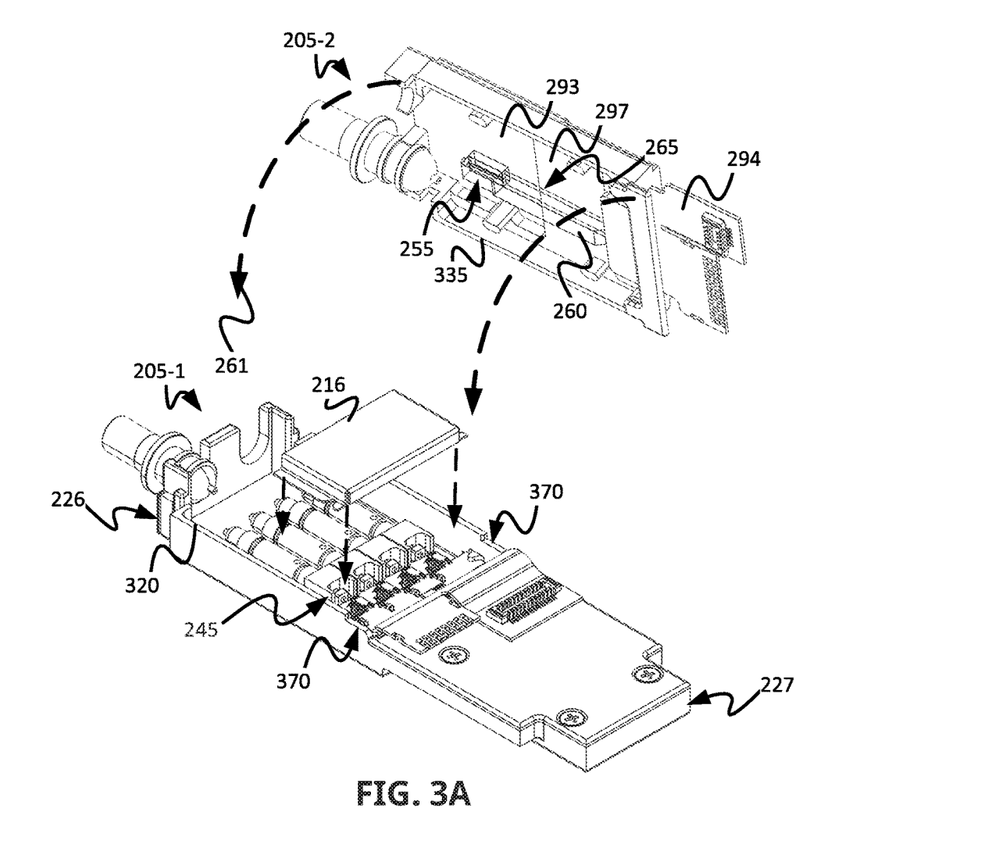
FIG. 3A shows a perspective view of the first and second portions of the optical transceiver module housing of FIGS. 2A and 2B, respectively, prior to coupling of the same to form an assembled optical transceiver module, in accordance with an embodiment of the present disclosure.

In some instances, such as shown in FIG. 2B, the input coupling region 255 is coupled to the AWG device 260 in an offset manner such that the input coupling region 255 protrudes beyond the surface 265 of the AWG chip region 269, which can be more clearly seen in FIGS. 3A and 4. In a practical sense, this may prevent the AWG device 260 from being disposed flat against the mounting surface 297 for coupling purposes. To this end, the ROSA housing portion 205-2 may include at least a first mounting surface 297 configured to couple to and support at least a portion of the AWG chip region 269 and/or associated circuitry, e.g., the photodiodes and TIAs 350 (FIG. 4). The ROSA housing portion 205-2 may further include a second mounting surface 293, with the second mounting surface 293 being offset/recessed relative to the first mounting surface 297. In some cases, the ROSA assembly 230 is directly coupled to a single mounting surface, e.g., mounting surface 297, without necessarily including a recessed mounting region.

Thus, and as shown in FIG. 4, the AWG device 260 may be disposed substantially flat on the first mounting surface 297 along at least a portion of its length with the second mounting surface 293 being recessed by an offset distance $D_1$ to receive (but not necessarily couple to) the optical input coupling region 255. The offset distance $D_1$ may equal about 1.5 mm, although other offset distances may be used to account for dimensional constraints imposed by other AWG/ROSA components depending on a desired configuration. In some cases, the offset distance $D_1$ may be uniform, e.g., continuous, or may be discontinuous.

Continuing on with FIG. 4, the AWG device 260 may be optically coupled to an array of photodiodes and associated TIAs 350 for the purposes of detecting, amplifying, and converting each of the channel wavelengths into an electrical signal. Each of the photodiodes and associated TIAs 350 may be electrically coupled to a flexible printed circuit (FPC) 294. The FPC 294 may be coupled to the base 228 of the ROSA housing portion 205-2. In some instances, the FPC 294 may be coupled to the ROSA housing portion 205-2 such that a surface 299 of the FPC 294 is substantially coplanar with at least one surface of the base 228.

A shield 345 (or shield member 345) may be coupled to the ROSA housing portion 205-2 and may cover the array of photodiodes and associated TIAs 350. The shield 345 may include one or more protrusions 355 for coupling to corresponding openings 360 located adjacent an end of the ROSA housing portion 205-2. Once received within the corresponding opening 360, the protrusions may couple the shield 345 to the ROSA housing portion 205-2 by, for example, a friction fit or snap-fit. In some instances, an adhesive may be applied to the one or more protrusions 355 prior to coupling into the plurality of openings 360. Therefore, in some instances, the shield 345 may be coupled to the ROSA housing portion 205-2 using a combination of an adhesive and a friction fit or a snap-fit. In other instances, the shield 345 may not include the one or more protrusions 355 and may, for example, be coupled to the ROSA housing portion 205-2 using an adhesive, a mechanical coupling means, such as, a screw, combinations thereof, or any other method of attachment.

Turning to FIG. 3A, with additional reference to FIG. 4, the TOSA housing portion 205-1 may include a groove 370 for receiving at least a portion of the shield 345 such that when the ROSA housing portion 205-2 is coupled to the TOSA housing portion 205-1, the presence of gaps at an interface 405 (FIG. 3B) between the ROSA housing portion 205-2 and the TOSA housing portion 205-1 are minimized.

Continuing with FIG. 3A, the TOSA housing portion 205-1 of the housing 205 may include dimensions that generally correspond to ROSA housing portion 205-2 to allow for mating/coupling. For example, the TOSA housing portion 205-1 may also include one or more mating surfaces 320 defined by the sidewall 330 of the TOSA housing portion 205-1. The one or more mating surfaces 320 of the TOSA housing portion 205-1 may couple to one or more corresponding mating surfaces 335 of the ROSA housing portion 205-2. In some instances, a friction fit may be formed between the mating surface 320 of the TOSA housing portion 205-1 and the corresponding mating surface 335 of the ROSA housing portion 205-2. In other instances, the mating surface 320 of the TOSA housing portion 205-1 and the mating surface 325 of the ROSA housing portion 205-2 may collectively form a snap-fit. In still other cases the mating surface 335 of the TOSA housing portion 205-1 and the mating surface 335 of the ROSA housing portion may simply be coupled together via adhesive, fastening members (e.g., screws, pins, and so on), friction fit, snap fit, or any combination thereof.

In any event, and in accordance with an embodiment, each of the TOSA and ROSA housing portions 205-1 and 205-2 may be independently assembled and also may be tested to ensure nominal performance separate from each other. Thus each of the TOSA and ROSA housing portions 205-1 and 205-2 may be assembled in parallel, e.g., at about the same time, or may be assembled at different times. Therefore, each of the TOSA and ROSA housing portions 205-1 and 205-2 may be disposed flat on a work surface, such as a workbench or other such fixture, to provide a relatively simplified work surface to perform attachment of optical subassembly components and associated circuitry, cabling, fiber routing, and so on. This advantageously minimizes or otherwise reduces incidences of component damage and the necessity of rework iterations that characterize other approaches to optical transceiver modules that attempt to couple and optically align both TOSA and ROSA arrangements in a single housing portion. Accordingly, a finalization stage of an assembly process may then include "flipping" over the ROSA housing portion 205-2 onto the TOSA housing portion 205-1 as shown by directional arrows 261 after each respective component includes requisite components, circuitry, intermediate fibers and so on. The finalization stage may also include coupling shield 216 to the TOSA housing portion 205-1 prior to such flip-over coupling of the ROSA housing portion 205-2. In a general sense, the ROSA housing portion 205-2 then becomes the cover for the assembled optical transceiver module 400. As the ROSA arrangement 230 and associated components are coupled to what essentially becomes a cover portion, the ROSA arrangement 230 may be referred to as a having a flip-over configuration as the same is disposed upside down relative to the TOSA arrangement 245 coupled to the TOSA housing portion 205-1. An assembly process in accordance with the aspects and scenarios disclosed herein may include manual stages, e.g., performed by one or more technicians, automated stages, e.g., by pick-and-place machines and other robotics, or any combination thereof.

Figure 3B:
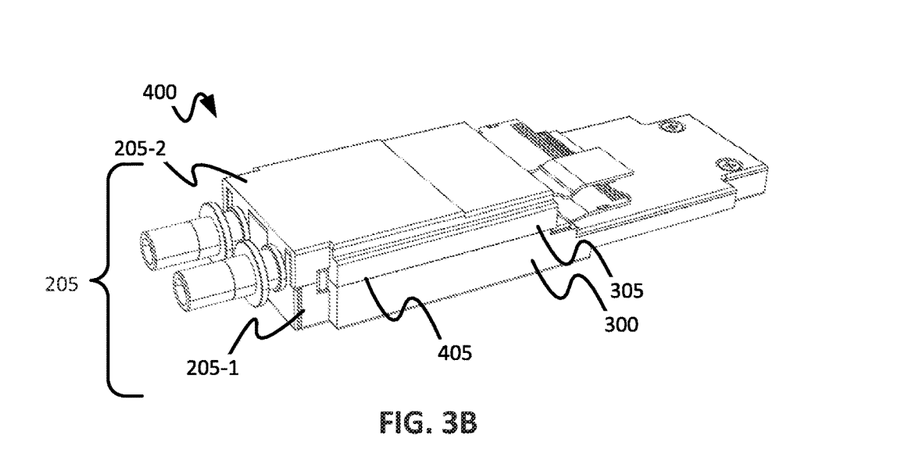
FIG. 3B shows a perspective view of an assembled optical transceiver module, in accordance with an embodiment of the present disclosure.

Turning to FIG. 3B, an optical transceiver module 400 is shown after a finalization stage couples the TOSA housing portion 205-1 to the ROSA housing portion 205-2, in accordance with an embodiment of the present disclosure. Post finalization, that is to say when the TOSA housing portion 205-1 is coupled to the ROSA housing portion 205-2, an external surface 300 of the TOSA housing portion 205-1 may be substantially coplanar with an external surface 305 of the ROSA housing portion 205-2. As shown, at least a portion of the ROSA arrangement 230 (FIG. 2) is disposed in a manner opposing the TOSA arrangement 245, with each of the ROSA arrangement 230 and TOSA arrangement 245 extending towards an interface 405 between respective housing portions.

The interface 405 may circumscribe the housing 205 at a location generally corresponding to where the ROSA housing portion 205-2 mates with the TOSA housing portion 205-1. The ROSA housing portion 205-2 may be coupled to the TOSA housing portion 205-1 using, for example, friction-fits, adhesives, mechanical couplers, such as, screws or snap fits, combinations thereof, and other like methods of attachment. The interface 405 may include one or more gaps and/or openings resulting from, for example, manufacturing tolerances. These gaps and/or openings may allow contaminants to enter the housing 205. To prevent, mitigate, and/or otherwise reduce the ingress of contaminants into the transceiver housing 205, a sealant and/or interstitial filler may be applied to the interface 405. The sealant may or may not have adhesive properties. In some instances, there may be more than one interface 405. In these situations, a sealant and/or interstitial filler may be applied to each of the interfaces 405.

Figure 5:
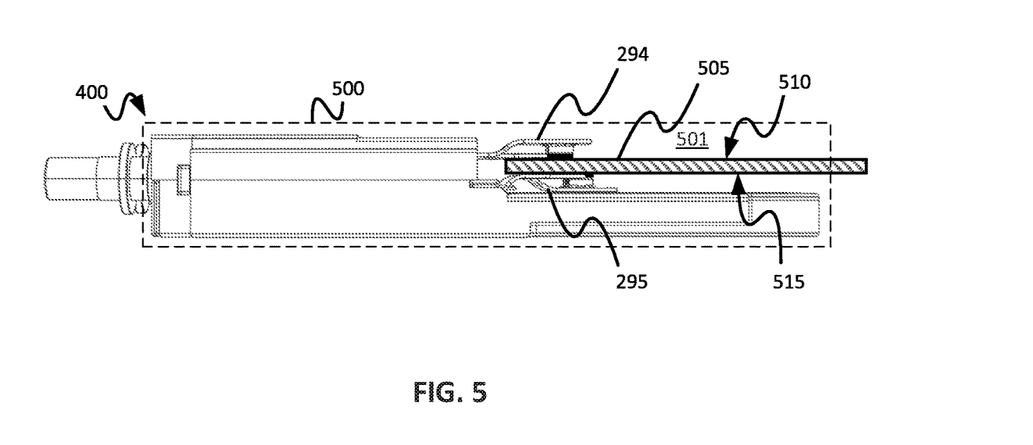
FIG. 5 is a side plan view of the assembled optical transceiver module of FIG. 3B having a printed circuit board (PCB) assembly coupled thereto, in accordance with an embodiment of the present disclosure.

Turning to FIG. 5, the finalization stage may also further include coupling a printed circuit board assembly (PCBA) 505 to each of the FPCs 294 and 295. The FPC 294 that corresponds to the ROSA arrangement 230 (FIG. 2B) may be electrically coupled to a ROSA facing surface 510 of the PCBA 505. The ROSA facing surface 510 is opposite a TOSA facing surface 515 of the PCBA 505. The TOSA facing surface 515 may be electrically coupled to the FPC 295 that corresponds to the TOSA arrangement 245 (FIG. 2A). In other words, the PCBA 505 may be disposed between each of the FPCs 294 and 295 such that the surface of the PCBA 505 that is proximal to the ROSA arrangement 230 relative to the TOSA arrangement 245 is electrically coupled to the FPC 294 that corresponds to the ROSA arrangement 230, and on the other hand, the surface of the PCBA 505 that is proximal to the TOSA arrangement 245 relative to the ROSA arrangement 230 is electrically coupled to the FPC 295 that corresponds to the TOSA arrangement 245. However, this example configuration is not intended to limit the present disclosure and other embodiments or within the scope of this disclosure.

In an embodiment, a secondary housing 500, such as a QSFP housing or other SFF housing, may optionally enclose at least a portion of assembled optical transceiver module 400 and at least a portion of the PCBA 505 within a cavity 501 defined by the secondary housing. The secondary housing may further be referred to as a host housing 500. Therefore, in some instances, a portion of the PCBA 505 extends outside of the secondary housing 500. The portion of the PCBA 505 that extends beyond the secondary housing 500 may electrically couple to an external device such as a pluggable receptacle for receiving and electrically coupling to a QSFP optical transceiver.

While the present disclosure generally illustrates the housing 205 as being a two-portion, or bi-furcated, transceiver module housing, the transceiver housing 205 is not necessarily limited in this regard. In some instances, the housing 205 may include at least three separable portions. In some cases, the housing 205 may include a clam shell or hinged configuration whereby the TOSA and ROSA housing portions 205-1 and 205-2 are coupled via a hinge or other similar device along interface 405 (FIG. 3B).

Additional Example Embodiments

In accordance with an aspect of the present disclosure an optical transceiver module is disclosed. The optical transceiver module comprising a housing including at least a first housing portion and a second housing portion, each of the first and second housing portions including a base portion providing at least one mounting surface and at least one sidewall extending therefrom that defines a compartment, wherein the first housing portion is configured to couple to the second housing portion to form a cavity therebetween, a transmitter optical subassembly (TOSA) arrangement coupled to the at least one mounting surface of the first housing portion, and a receiver optical subassembly (ROSA) arrangement coupled to at least one mounting surface of the second housing portion, wherein the TOSA arrangement and the ROSA arrangement are disposed opposite each other within the cavity when the first housing portion is coupled to the second housing portion.

In accordance with another aspect of the present disclosure an optical transceiver module is disclosed. The optical transceiver module comprising a housing including at least a first housing portion coupled opposite a second housing portion, wherein the first housing portion includes a first base having at least one first sidewall extending therefrom, wherein the first base and an inner surface of the at least one first sidewall defines a first compartment, and the second housing portion includes a second base having at least one second sidewall extending therefrom, wherein the second base and an inner surface of the at least one second sidewall define a second compartment, a transmitter optical subassembly (TOSA) arrangement disposed at least partially within the first compartment and coupled to the first base of the first housing portion, and a receiver optical subassembly (ROSA) arrangement disposed at least partially within the second compartment and coupled to the second base of the second housing portion.

In accordance with another aspect of the present disclosure an optical transceiver is disclosed. The optical transceiver comprising a pluggable housing, an optical transceiver module housing at least partially disposed in the pluggable housing, the optical transceiver module housing comprising a first housing portion defined by a first base and at least one first sidewall extending therefrom, wherein the first base and an inner surface of the first sidewall define a first compartment, and a second housing portion defined by a second base and at least one second sidewall extending therefrom, wherein the second base and an inner surface of the second sidewall define a second compartment, a transmitter optical subassembly (TOSA) arrangement disposed within the first compartment, a receiver optical subassembly (ROSA) disposed within the second compartment, a first flexible printed circuit (FPC) electrically coupled to the TOSA and a second FPC electrically coupled to the ROSA, and a printed circuit board assembly (PCBA) electrically coupled to the first FPC and to the second FPC.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. An optical transceiver module comprising:
   a housing including at least a first housing portion and a second housing portion, each of the first and second housing portions including a base portion providing at least one mounting surface and at least one sidewall extending therefrom that defines a compartment, wherein the first housing portion is configured to couple to the second housing portion to form a cavity therebetween;
   a transmitter optical subassembly (TOSA) arrangement mounted to the at least one mounting surface of the first housing portion; and
   a receiver optical subassembly (ROSA) arrangement mounted to at least one mounting surface of the second housing portion,
   wherein the TOSA arrangement is disposed in the compartment of the first housing portion and the ROSA arrangement is disposed in the compartment of the second housing portion, the TOSA arrangement and ROSA arrangement being disposed opposite each other within the cavity when the first housing portion is coupled to the second housing portion, and wherein the TOSA arrangement remains mounted to the at least one mounting surface of the first housing portion and the ROSA arrangement remains mounted to the at least one mounting surface of the second housing portion when the first and second housing portions are decoupled from each other.

2. The optical transceiver module of claim 1, wherein each of the at least one mounting surfaces of the first and second housing portions, respectively, include a substantially equal total surface area for mounting to optical and electrical components.

3. The optical transceiver module of claim 1, wherein the second housing portion includes at least a first mounting surface and a second mounting surface.

4. The optical transceiver module of claim 3, wherein the first mounting surface is offset relative to the second mounting surface by an offset distance $D_1$.

5. The optical transceiver module of claim 4, wherein the offset distance $D_1$ equals about 1.5 millimeters.

6. The optical transceiver module of claim 1, further comprising a first shield member coupled to the first housing portion to electrically isolate at least a portion of the TOSA arrangement from the ROSA arrangement when the first and second housing portions are coupled together.

7. The optical transceiver module of claim 1, further comprising a second shield member coupled to the second housing portion to electrically isolate at least a portion of the ROSA arrangement from the TOSA arrangement when the first and second housing portions are coupled together.

8. The optical transceiver module of claim 1, further comprising the first housing portion coupled to the second housing portion, and wherein each respective compartment of the first and second housing portions collectively define the cavity.

9. A quad small form-factor pluggable (QFSP) transceiver implementing the optical transceiver module of claim 1.

10. An optical transceiver module comprising:
a housing including at least a first housing portion coupled opposite a second housing portion, wherein:
the first housing portion includes a first base having at least one first sidewall extending therefrom, wherein the first base and an inner surface of the at least one first sidewall defines a first compartment; and
the second housing portion includes a second base having at least one second sidewall extending therefrom, wherein the second base and an inner surface of the at least one second sidewall define a second compartment;
a transmitter optical subassembly (TOSA) arrangement disposed at least partially within the first compartment and mounted to the first base of the first housing portion; and
a receiver optical subassembly (ROSA) arrangement disposed at least partially within the second compartment and mounted to the second base of the second housing portion,
wherein the TOSA arrangement remains mounted to the first base and the ROSA arrangement remains mounted to the second base when the first and second housing portions are decoupled from each other.

11. The optical transceiver module of claim 10, further comprising a first flexible printed circuit (FPC) electrically coupled to the ROSA arrangement and a second FPC electrically coupled to the TOSA.

12. The optical transceiver module of claim 11, further comprising a printed circuit board assembly (PCBA), wherein a first side of the PCBA is electrically coupled to the first FPC and a second side of the PCBA is electrically coupled to the second FPC.

13. The optical transceiver module of claim 12, further comprising a shield member mounted to the second housing portion to electrically isolate at least a portion of the ROSA arrangement from the TOSA arrangement when the first and second housing portions are coupled together.

14. The optical transceiver module of claim 13, wherein the first portion of the housing includes a groove for receiving at least a portion of the shield member.

15. The optical transceiver module of claim 10, wherein the first base and the second base each define at least one mounting surface, respectively, and wherein each of the at least one mounting surfaces of the first base and the second base include a substantially equal total surface area for coupling to optical and electrical components.

16. The optical transceiver module of claim 10, wherein the first and second compartments have a substantially equal volume.

17. An optical transceiver comprising:
a pluggable housing;
an optical transceiver module housing at least partially disposed in the pluggable housing, the optical transceiver module housing comprising:
a first housing portion defined by a first base and at least one first sidewall extending therefrom, wherein the first base and an inner surface of the first sidewall define a first compartment; and
a second housing portion defined by a second base and at least one second sidewall extending therefrom, wherein the second base and an inner surface of the second sidewall define a second compartment;
a transmitter optical subassembly (TOSA) arrangement disposed within the first compartment and mounted to a surface defining the first compartment;
a receiver optical subassembly (ROSA) disposed within the second compartment and mounted to a surface defining the second compartment, wherein the TOSA arrangement remains mounted to the surface defining the first compartment and the ROSA arrangement remains mounted to the surface defining the second compartment when the first and second housing portions are decoupled from each other;
a first flexible printed circuit (FPC) electrically coupled to the TOSA and a second FPC electrically coupled to the ROSA; and
a printed circuit board assembly (PCBA) electrically coupled to the first FPC and to the second FPC.

18. The optical transceiver of claim 17, wherein the first base and second base include at least one mounting surface, respectively, and wherein each of the at least one mounting surfaces include a substantially equal total surface area for coupling to optical and electrical components.

19. The optical transceiver of claim 17, wherein the second housing portion includes at least a first mounting surface and a second mounting surface, and wherein the first mounting surface is offset relative to the second mounting surface by an offset distance $D_1$.

20. The optical transceiver of claim 17, wherein the pluggable housing comprises a quad small form-factor pluggable (QSFP) housing.

* * * * *